United States Patent [19]

Slater

[11] 4,258,545

[45] Mar. 31, 1981

[54] OPTIMAL CONTROL FOR A GAS TURBINE ENGINE

[75] Inventor: Gary L. Slater, Lawrenceburg, Ind.

[73] Assignee: General Electric Company, Cincinnati, Ohio

[21] Appl. No.: 915,701

[22] Filed: Jun. 15, 1978

[51] Int. Cl.³ .............................................. F02K 3/02
[52] U.S. Cl. ............................. 60/226 R; 60/39.28 T; 60/238; 60/239; 60/243
[58] Field of Search .................... 60/226 R, 243, 235, 60/236, 238, 239, 39.28

[56] References Cited

U.S. PATENT DOCUMENTS

| | | | |
|---|---|---|---|
| 3,797,233 | 3/1974 | Webb et al. | 60/39.16 R |
| 3,854,287 | 12/1974 | Rembold | 60/39.16 R |
| 4,018,044 | 4/1977 | Joby et al. | 60/39.28 R |
| 4,051,669 | 10/1977 | Yannone et al. | 60/39.28 R |

*Primary Examiner*—Robert E. Garrett
*Assistant Examiner*—Edward Look

*Attorney, Agent, or Firm*—Carl L. Silverman; Derek P. Lawrence

[57] ABSTRACT

A method and apparatus for optimally controlling a gas turbine engine utilizes feedback signals each of which is a function of a plurality of output variables. Control signals are generated and transmitted to actuators which vary engine control variables to provide a desired level of engine performance. Signals representative of rated values of a plurality of engine output variables for the selected level of engine performance are generated and are compared with signals representative of actual values of the corresponding output variables to produce difference signals. One or more of the difference signals may also be integrated. The difference signals may also be weighted relative to each other as a function of ambient conditions and/or the selected level of engine performance. A plurality of the difference signals are then utilized to generate an individual feedback signal for each of the control variables. The feedback signals are tailored to modify the corresponding control variables.

12 Claims, 6 Drawing Figures

OPTIMAL CONTROL FOR A GAS TURBINE ENGINE

BACKGROUND OF THE INVENTION

1. Field of the Invention

This invention relates generally to gas turbine engines and, more particularly, to a method and apparatus for optimally controlling a gas turbine engine.

2. Description of the Prior Art

Modern gas turbine engines have numerous control features which allow for efficient engine operation over a wide range of operating conditions. Because of the interactions between such diverse features as fuel flow, variable fan pitch, variable fan exhaust nozzle areas, etc., a much more complex control system is required if engine efficiency is to be maintained over a widely varying range of ambient conditions and modes of engine operation.

Traditional prior art control systems have relied upon the combination of a number of uncoordinated single closed control loops each of which controlled a particular individual control variable as a function of a single output variable. While the interrelationships between the various individual control loops have increased, the basic design approach of such control systems, combining a number of unrelated closed control loops, has remained the same. The result is that the prior art control systems are inherently unable to fully optimize engine operating efficiency over the entire range of engine operating conditions.

It is, therefore, an object of the present invention to provide a control system for a gas turbine engine in which the control variables are controlled as a function of a plurality of the output variables.

Another object of the present invention is to provide such a control system which automatically optimizes engine operating efficiency over the entire range of operating conditions.

A further object of the present invention is to provide such a control system which automatically accommodates both manufacturing and wear tolerances.

Still another object of the present invention is to provide such a control system in which one or more of the output variables are integrated in order to improve response time.

SUMMARY OF THE INVENTION

Briefly stated, these and other objects which will hereinafter become more readily apparent are accomplished by the present invention which, in one form, provides a method and apparatus for optimally controlling a gas turbine engine by controlling engine control variables as a function of a plurality of engine output variables. Engine control signals are generated and transmitted to actuators which vary the engine control variables to provide a desired level of engine performance. Signals representative of rated values of specific engine output variables for the desired level of engine performance are also generated and are subsequently compared with signals representative of the actual values of the corresponding output variables to produce difference signals. One or more of the difference signals may be integrated in order to improve response time and to eliminate the effect of disturbances which remain constant. The difference signals may also be weighted relative to each other as a function of the ambient operating conditions and/or the mode of engine operation. A plurality of the difference signals are then utilized to generate an individual feedback signal for each of the control variables. The feedback signals are tailored to modify the corresponding control variables.

DESCRIPTION OF THE PREFERRED EMBODIMENT

Figure 1:
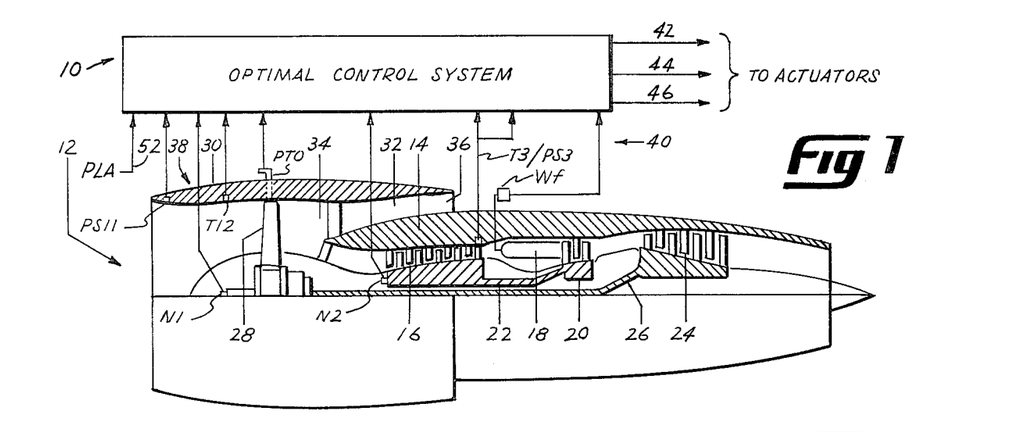
FIG. 1 is a schematic of the turbofan engine to which the preferred embodiment of the present invention relates.

Referring to FIG. 1, the present invention is shown generally at 10 as a control system for a gas turbine engine of the turbofan type shown generally at 12. Although in this particular embodiment a turbofan engine is controlled, it should be understood that the control system 10 can be employed with any other gas turbine engine such as a turbojet or a turboshaft. Turbofan engine 12 is comprised of a core engine 14 which includes, in serial flow relationship, a compressor 16, a combustor 18, and a high pressure turbine 20. The high pressure turbine 20 is drivingly connected to the compressor 16 by a core rotor 22. The engine 12 is also comprised of a low pressure system, which includes a low pressure turbine 24 which is drivingly connected by a low pressure shaft 26 to a variable pitch fan 28. An outer nacelle 30 is spaced apart from the core engine 14 to define a bypass duct 32 therebetween. The forward portion of the bypass duct 32 defines an inlet 34 for receiving bypass air from the fan 28. The aft portion of the bypass duct 32 defines a variable area fan exhaust nozzle 36 through which fan bypass air is exhausted. Engine 12 is a state-of-the-art turbofan engine and a detailed description of its operation is believed to be unnecessary for purposes of describing the present invention.

As shown in FIG. 1, the control system 10, which is preferably of the digital electronic type, receives signals from a plurality of engine sensor means or sensors, shown generally as 38 over a plurality of conducting means, hereinafter called "lines" and shown generally as 40. Individual sensor means may be of any well-known type which provides an appropriate indication of the particular engine variable being measured. A more detailed description of the particular engine variables which are being measured by the sensor means 38 is presented below.

The control system 10 also transmits engine control signals over three output lines 42, 44 and 46, to means for varying engine control variables, sometimes called actuator means (not shown). The actuator means may be of any well-known type, some examples of which are hydromechanical or hydroelectrical actuators.

Figure 2:
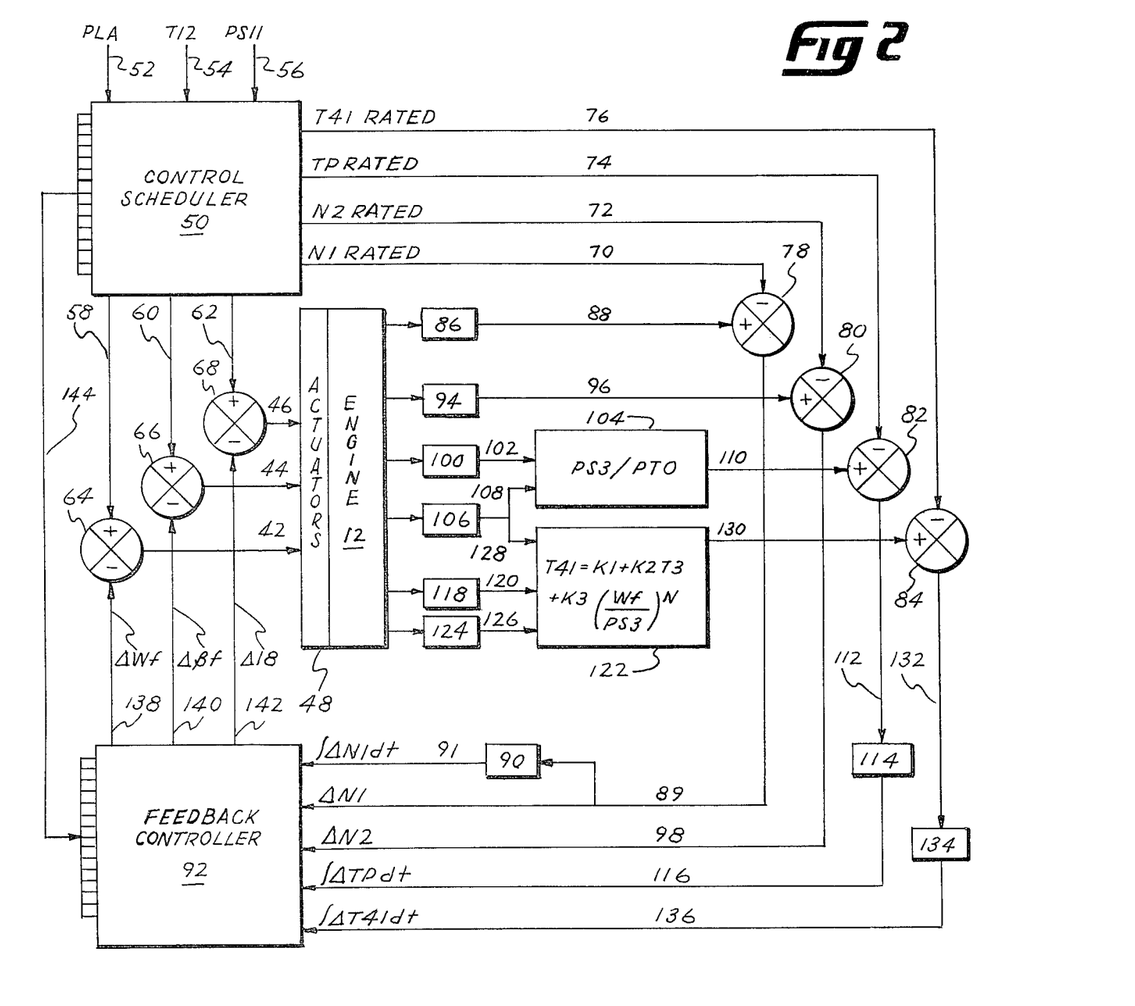
FIG. 2 is a block diagram of the preferred embodiment of the control system of the present invention.

Referring now to FIG. 2, there is shown a block diagram of the control system of the present invention. The basic design approach of the control system is to utilize only a low order dynamic engine model comprised of a combination of mechanical output variables which respond relatively slowly and thermodynamic output variables which are inherently "fast variables". The use of integral outputs in conjunction with the thermodynamic variables permits fast response time and eliminates the effects of constant disturbances while retaining the simplicity of a low order dynamic engine model.

A signal representative of the desired mode of engine operation as determined by the power lever angle (PLA) is supplied along line 52 to a control scheduler 50. Control scheduler 50 also receives signals representative of ambient conditions, such as the fan inlet temperature (T12) and the inlet static pressure (PS11) along lines 54 and 56, respectively. Although T12 and PS11 are used in this particular embodiment, it would be obvious to one skilled in the art to employ other signals which are representative of existing ambient conditions in conjunction with the present invention.

The control scheduler 50 generates engine control signals, in a manner which will be described in greater detail below, in order to provide a desired level of engine performance as selected by an engine operator or an aircraft flight control computer. The engine control signals are representative of a nominal demanded value for engine control variables which, in this embodiment, comprise fuel flow, fan pitch and fan exhaust nozzle area, and are transmitted along lines 58, 60 and 62, respectively, to summers 64, 66 and 68, respectively. The engine control signals are then modified by feedback signals as will be discussed in greater detail below, and are transmitted to engine actuator means or actuators 48 over lines 42, 44 and 46, respectively. Actuators 48 vary the fuel flow, fan pitch and fan nozzle exhaust area in response to the modified engine control signals in order to provide the desired level of engine performance.

The control scheduler 50 also generates signals representative of a rated value for each of a plurality of engine output variables. The rated values are estimates of what the output variables should be, based upon known engine behavioral characteristics when operating at the selected power lever angle and under the existing ambient conditions. The output variables selected for use in this particular embodiment of the present invention include two mechanical output variables, fan speed (N1) and core engine speed (N2) and two thermodynamic output variables, turbine inlet temperature (T41) and an engine thrust parameter (TP). The rated output variable signals are transmitted along lines 70, 72, 74 and 76 to four summers 78, 80, 82 and 84, respectively.

An indication of the actual fan speed N1 is determined by a sensor 86 and a representative signal is transmitted to summer 78 along line 88. Summer 78 compares the actual N1 signal with the rated N1 signal received along line 70 and generates a fan speed difference signal ($\Delta$N1) which is transmitted along line 89 to a feedback controller 92. Likewise, an indication of the actual core engine speed N2 is determined by a sensor 94 and a representative signal is transmitted along line 96 to summer 80. Summer 80 compares the actual N2 signal with the rated N2 signal received along line 72 and generates a core engine speed difference signal ($\Delta$N2) which is also transmitted to the feedback controller 92 along line 98.

A signal representative of the actual engine thrust is generated as a function of the ratio of the compressor discharge static pressure (PS3) to the free stream total pressure (PTO). Sensor 100 determines the PTO and a representative signal is passed along line 102 to a nonlinear function generator 104. The PS3 is determined by a sensor 106 and is also passed to nonlinear function generator 104 via line 108. Nonlinear function generator 104 generates a thrust parameter signal (TP) which is representative of the actual thrust and is transmitted via line 110 to summer 82. It is to be understood that although the ratio of PS3 to PTO is employed as an indication of actual thrust, any other indicator of thrust could be employed in the alternative. Summer 82 compares the actual TP signal with the rated TP signal received over line 74 and generates a thrust difference signal ($\Delta$TP) which is transmitted over line 112 to integrator 114.

Integrator 114 receives the $\Delta$TP signal and generates a signal representative of the integral of $\Delta$TP ($\int \Delta$TPdt) which is transmitted via line 116 to feedback controller 92. As discussed above, the use of a thrust parameter, an inherently "fast" output variable, coupled with an integration, provides for the elimination of the effects of disturbances which remain constant while providing for fast response time.

The actual turbine inlet temperature is calculated as a function of the compressor discharge temperature, the fuel flow and the compressor discharge static pressure. The compressor discharge temperature (T3) is determined by a sensor 118 and a representative signal is transmitted via line 120 to a nonlinear function generator 122. Sensor 124 determines fuel flow (Wf) and a representative signal is transmitted via line 126 to nonlinear function generator 122. A signal representative of the compressor discharge static pressure (PS3) is also transmitted to nonlinear function generator 122 via line 128.

Nonlinear function generator 122 generates a signal representative of the actual turbine inlet temperature (T41) which is transmitted via line 130 to summer 84. It is to be understood that any other indication of turbine inlet temperature could alternatively be employed. Summer 84 compares the actual T41 signal with the rated T41 signal received over line 76 and generates a turbine inlet temperature difference signal ($\Delta$T41) which is transmitted via line 132 to an integrator 134.

The T41 difference signal is also integrated in order to provide fast response time and to eliminate the effects of disturbances which remain constant. An integrator 134 receives signal $\Delta$T41 and generates a signal representative of the integral of $\Delta$41 ($\int \Delta$T41dt) which is transmitted via line 136 to feedback controller 92.

In order to help eliminate the effects of constant fan speed variations, the fan speed difference signal $\Delta$N1 is integrated and utilized in addition to the $\Delta$N1 signal to generate the feedback signals. Integrator 90 receives the $\Delta$N1 signal along line 89, integrates it and transmits the integrated signal ($\int \Delta$N1dt) along line 91 to the feedback controller 92.

The feedback controller 92 receives the two mechanical output variable difference signals ($\Delta$N1 and $\Delta$N2) and the three integrated output variable difference signals ($\int \Delta$TPdt, $\int \Delta$T41dt and $\int \Delta$N1dt) and generates feedback signals for each of the engine control variables (Wf, $\beta$f and A18) as a function of all five of the output variable difference signals. Feedback controller 92 then transmits the generated feedback signals ($\Delta$Wf, $\Delta\beta$f and $\Delta$A18) over lines 138, 140 and 142 to summers 64, 66 and 68, respectively. Summers 64, 66 and 68 combine the respective feedback signals with the nominal demanded engine control signals from the control scheduler 50 to produce actual demanded engine control signals which are transmitted to the actuators via lines 42, 44 and 46, respectively. A more detailed description of the operation of feedback controller 92 will be presented below.

Control scheduler 50 also generates a series of feedback gain signals which are transmitted to the feedback controller 92 via a plurality of lines shown as 144. The purposes of the feedback gain signals will be discussed in greater detail below.

Figure 3:
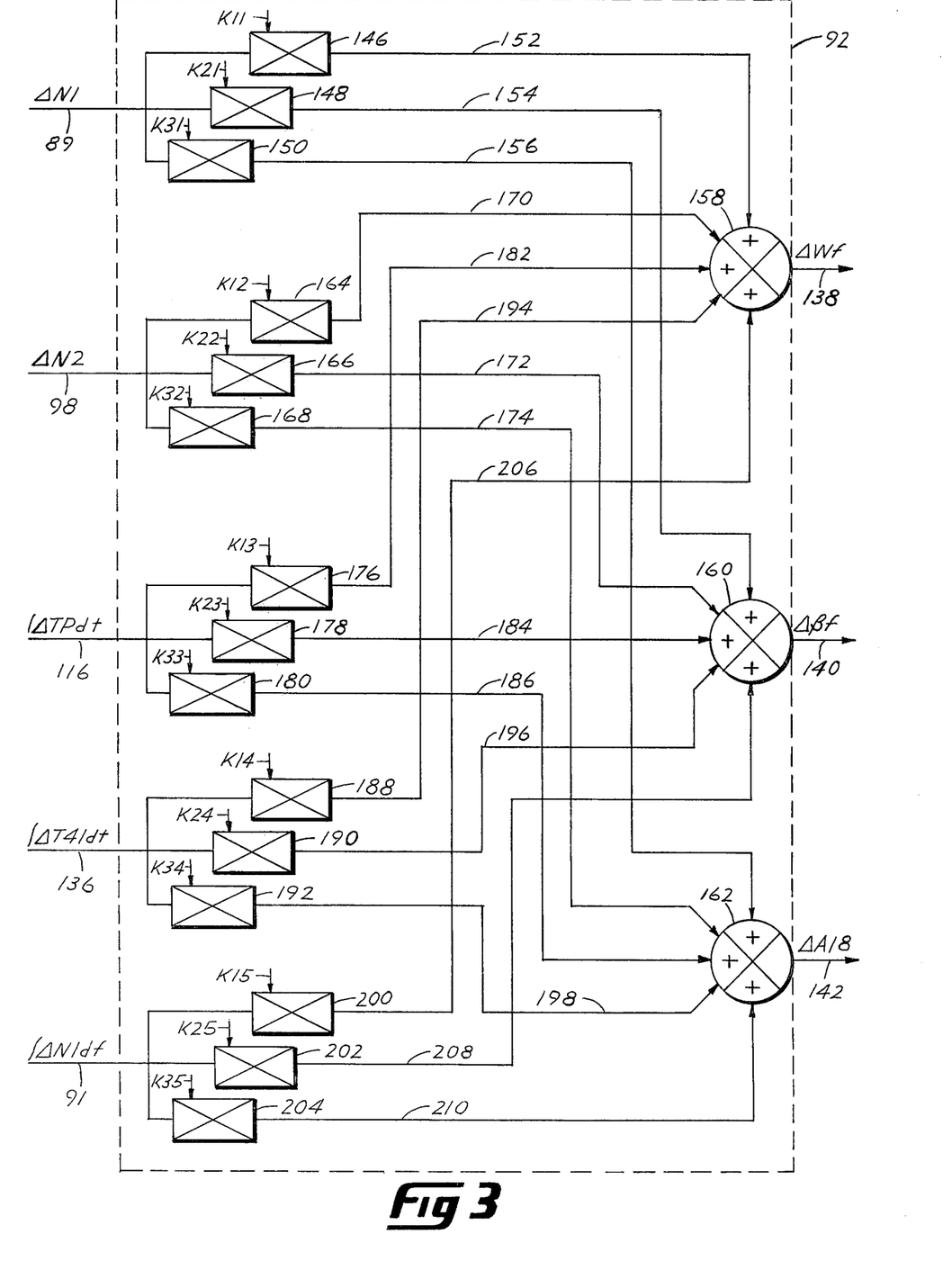
FIG. 3 is a more detailed block diagram of the feedback controller of FIG. 2.

Referring now to FIG. 3, there is shown a more detailed block diagram of the feedback controller 92. The feedback controller 92 operates to maintain control of the engine about a preselected desired level of engine performance, conveniently called an engine operating point, while minimizing excursions in engine thrust and the other engine output variables. The engine operating point is determined by the control scheduler 50 based upon the ambient operating conditions (PS11 or T12 or both) and the particular mode of engine operation (take-off, cruise, climb, landing, etc.) as determined by the power lever angle (PLA). For example, assuming the engine is operating at a fixed temperature and pressure, the control scheduler 50 operates to provide maximum thrust and minimum noise during a takeoff mode of engine operation whereas during a cruise mode, the control scheduler 50 operates to optimize fuel consumption by appropriate variations to the control variables. In a similar manner, assuming a constant mode of engine operation, the control scheduler 50 operates differently at low altitudes (high ambient temperature and pressure) than at higher altitudes in order to optimize for example fuel control while maintaining a desired air speed. Thus, it is apparent that the control scheduler 50 operates to optimize different engine characteristics under different operating conditions. In addition, the control scheduler 50 may be made to optimize particular engine characteristics based upon other parameters for example to minimize the consumption of fuel under all operating conditions.

In order for the feedback controller 92 to properly maintain control of the engine about the particular operating point selected by the control scheduler 50 it is necessary to tailor the feedback signals in accordance with the ambient operating conditions and mode of engine operation. This tailoring is accomplished by weighing the effects that the output variable difference signals have upon each of the generated feedback signals. The weighing is accomplished by multiplying each of the output variable difference signals by appropriate feedback gain signals. As will be discussed in greater detail below, the values of the feedback gains are determined by the control scheduler 50.

As shown in FIG. 3, the fan speed difference signal ($\Delta N1$) is received by feedback gain multipliers 146, 148 and 150 which also receive feedback gain signals K11, K21 and K31, respectively. Multipliers 146, 148 and 150 multiply the $\Delta N1$ signal by the respective gain signals and transmit the resulting signals (K11$\Delta N1$, K21$\Delta N1$ and K31$\Delta N1$) along lines 152, 154 and 156 to summers 158, 160 and 162, respectively. In a similar manner, the core engine speed difference signal ($\Delta N2$) is received by feedback gain multipliers 164, 166 and 168 where it is multiplied by feedback gain signals K12, K22 and K32 respectively which are received from the control scheduler 50. The resulting signals (K12$\Delta N2$, K22$\Delta N2$ and K32$\Delta N2$) are also transmitted to summers 158, 160 and 162 respectively along lines 170, 172 and 174. The integrated engine thrust difference signal ($\int \Delta TPdt$) is received by feedback gain multipliers 176, 178 and 180 where it is multiplied by feedback gain signals K13, K23 and K33 respectively which are received from the control scheduler 50. The resulting signals (K13$\int \Delta TPdt$, K23$\int \Delta TPdt$ and K33$\int \Delta TPdt$) are also transmitted to summers 158, 160 and 162 respectively via lines 182, 184 and 186. Likewise, the integrated turbine inlet temperature difference signal ($\int \Delta T41dt$) is received by feedback gain multipliers 188, 190 and 192 where it is multiplied by feedback gain signals K14, K24 and K34 respectively, which are received from the control scheduler 50. The resulting signals (K14$\int \Delta T41dt$, K24$\int \Delta T41dt$ and K34$\int \Delta T41dt$) are also transmitted to summers 158, 160 and 162 respectively via lines 194, 196 and 198. The integrated fan speed difference signal ($\int \Delta N1dt$) is received by feedback gain multipliers 200, 202 and 204 where it is multiplied by feedback gain signals K15, K25 and K35 respectively. The resulting signals (K15$\int \Delta N1dt$, K25$\int \Delta N1dt$ and K35$\int \Delta N1dt$) are also transmitted to summers 158, 160 and 162 respectively via lines 206, 208 and 210.

Summer 158 combines the five weighted signals received along lines 152, 170, 182, 194 and 206 and outputs a fuel flow feedback signal ($\Delta Wf$) which is representative of the equation:

$$\Delta Wf = K11\Delta N1 + K12\Delta N2 + K13\int \Delta TPdt + K14\int \Delta T41dt + K15\int \Delta N1dt \quad (1)$$

In a similar manner, summer 160 combines the five weighted signals received via lines 154, 172, 184, 196 and 208 and outputs a fan pitch feedback signal ($\Delta \beta f$) which is representative of the equation:

$$\Delta \beta f = K21\Delta N1 + K22\Delta N2 + K23\int \Delta TPdt + K24\int \Delta T41dt + K25\int \Delta N1dt \quad (2)$$

Summer 162 likewise combines the five weighted signals received along lines 156, 174, 186, 198 and 210 and outputs a fan exhaust nozzle area feedback signal ($\Delta A18$) which is representative of the equation:

$$\Delta A18 = K31\Delta N1 + K32\Delta N2 + K33\int \Delta TPdt + K34\int \Delta T41dt + K35\int \Delta N1dt \quad (3)$$

As is readily apparent from the above equations, each of the control variable feedback signals is a function of the output variable difference signals as weighted (relative to each other) depending upon the mode of engine operation and the existing ambient conditions.

Figure 4:
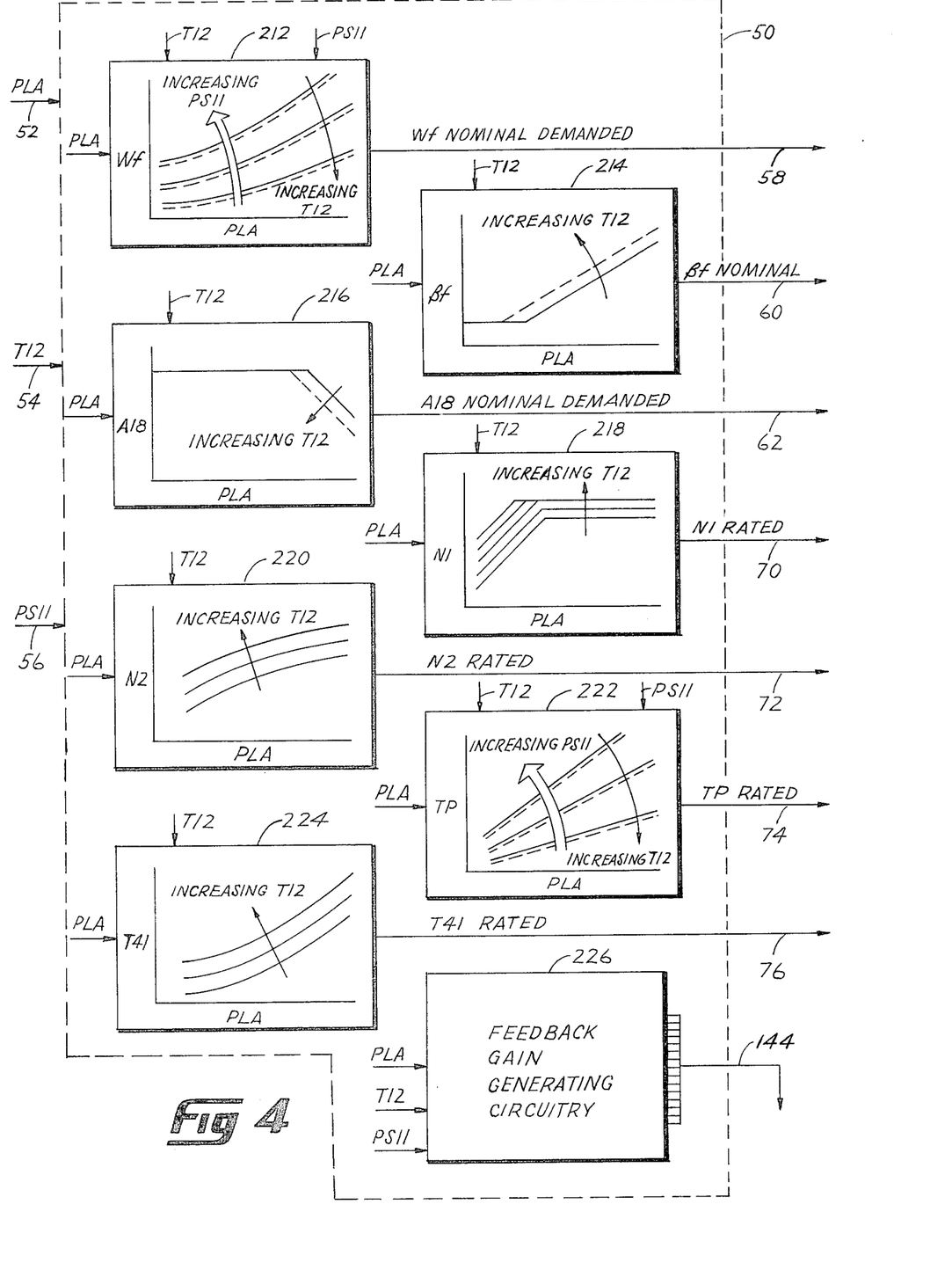
FIG. 4 is a more detailed block diagram of the control scheduler of FIG. 2.

Referring now to FIG. 4, there is shown a more detailed block diagram of the control scheduler 50. Signals representative of the power lever angle (PLA) and the ambient operating conditions are received by nonlinear function generators 212, 214, 216, 218, 220, 222 and 224. Function generators 212, 214 and 216 respectively generate control signals representative of nominal demanded values for the fuel flow (Wf), fan pitch ($\beta f$) and fan exhaust nozzle are (A18). These control signals are outputed on lines 58, 60 and 62 respectively, and are utilized for an initial nominal setting of the control variables which is further refined by the control variable feedback signals. Nonlinear function generators 218, 220, 222 and 224 generate signals representative of the rated value for each of the four output variables based upon anticipated engine operational characteristics at the selected power lever angle and under the existing ambient conditions.

Figure 5A:
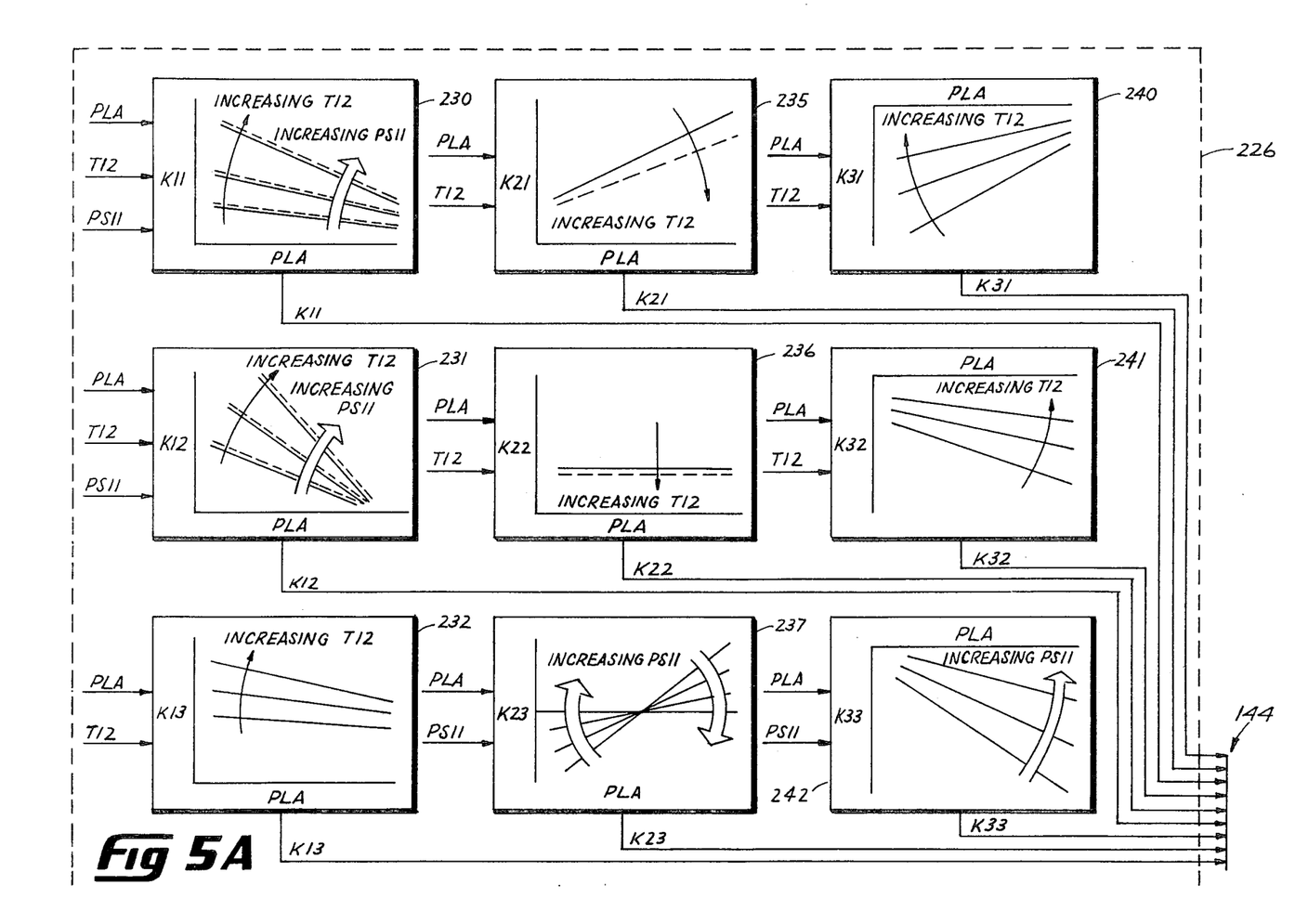
FIG. 5 is a more detailed block diagram of a portion of FIG. 4.
Figure 5B:
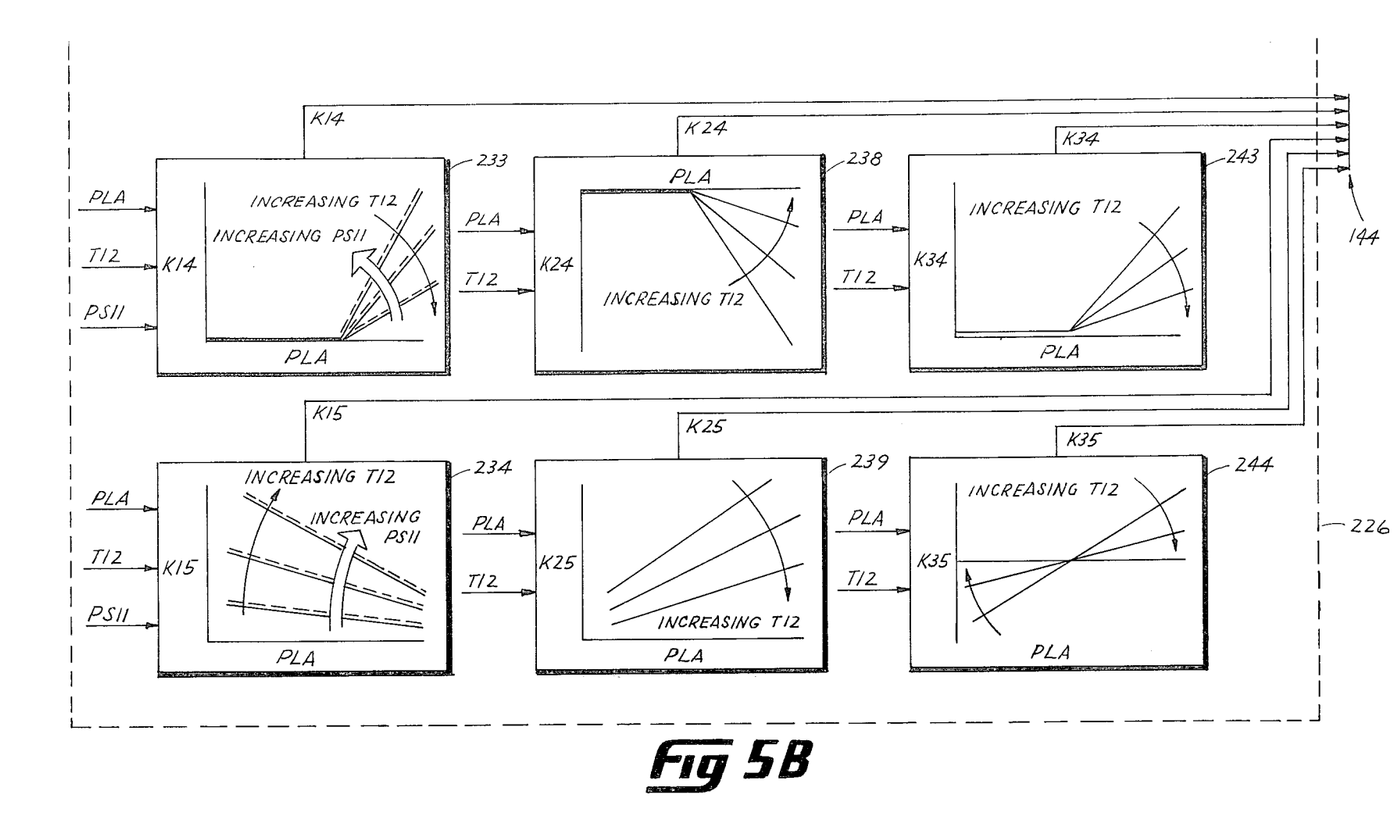

The control scheduler 50 also includes circuitry 226 for the generation of the feedback gain signals. As best shown in FIG. 5, the feedback gain signal generating circuitry 226 is comprised of fifteen multidimensional nonlinear function generators 230–244. As can be seen in FIG. 5, each of the function generators 230–244 receives a signal representative of the power lever angle and one or more signals representative of the existing ambient conditions (PS11, T12 or both) and generates a feedback gain signal in response thereto. The feedback gains are determined for each engine operating point by applying the mathematical theory of optimal control. Formally, the gains are derived by minimizing the function:

$$V = \int_0^\infty \left[ C1(\Delta N1)^2 + C2(\Delta N2)^2 + C3(\int_0^+ \Delta TPdt)^2 + C4(\int_0^+ \Delta T41dt)^2 + C5(\int_0^+ \Delta N1dt)^2 + C6(\Delta A18)^2 + C7(\Delta Wf)^2 + C8(\Delta \beta f)^2 \right] dt$$

where the coefficients C1–C8 are picked by engineering knowledge of the function to be minimized and by interactive adjustments until a desired engine response is obtained. This procedure generates a set of feedback gains which maintain the engine output variables close to their scheduled values, optimize speed of response of the engine to changes in the operating point and maintain engine stability. The gains are adjusted for variations in ambient operating conditions by the use of standard engine corrected variables obtained from dimensional analysis. Each of the generated feedback gain signals is transmitted along a plurality of lines shown generally as 144 to the corresponding feedback gain multiplier located within the feedback controller 92.

From the foregoing description, it can be seen that the present invention comprises a method and apparatus for optimally controlling a gas turbine engine utilizing feedback signals, which are generated as a function of a plurality of engine output variables. It will be recognized by one skilled in the art that changes may be made to the above-described invention without departing from the broad inventive concepts thereof. It is to be understood, therefore, that this invention is not limited to the particular embodiment disclosed, but it is intended to cover, in the appended claims, all modifications which are within the spirit and the scope of this invention.

What is claimed is:

1. An improved gas turbine engine control system including:
   means for generating engine control signals for maintaining a desired level of engine performance;
   means for receiving said engine control signals and for varying engine control variables in response thereto;
   means for generating signals representative of the actual values of engine output variables;
   means for generating signals representative of rated values of engine output variables for the desired level of engine performance; and
   comparison means for comparing the rated engine output variable signals with the corresponding actual engine output variable signals and for generating difference signals
   wherein the improvement comprises:
   feedback generator means for receiving said difference signals and for generating a feedback signal for each of said control variables, each feedback signal being a function of a plurality of said difference signals;
   means responsive to ambient operating conditions for tailoring said feedback signals to maintain control of the engine about a particular operating point with said tailoring being accomplished by weighing said difference signals relative to each other; and
   means for receiving said feedback signals and for modifying said engine control signals in response thereto.

2. The control system of claim 1 and further comprising:
   means interposed between said comparison means and said feedback generator means for integrating one or more of said difference signals prior to said difference signals being received by said feedback generator means.

3. The control system of claim 1 and further comprising
   means responsive to a selected mode of engine operation for tailoring said feedback signals to maintain control of the engine about a particular operating point.

4. In a gas turbine engine of the turbofan type which includes a variable pitch fan, a variable area fan exhaust nozzle, and a fuel flow valve, an improved control system including a core engine speed sensor, a fan speed sensor, means for providing an indication of actual engine thrust and means for providing an indication of actual turbine inlet temperature, the improvement comprising:
   means for generating control signals representative of nominal values of the fuel flow, fan pitch and fan exhaust nozzle area for providing a desired level of engine performance;
   means for receiving said control signals and for varying the fuel flow, fan pitch and fan exhaust nozzle area in response thereto;
   means for generating signals representative of rated values of core engine speed, fan speed, engine thrust and turbine inlet temperature corresponding to the desired level of engine performance;
   comparison means for comparing the rated core engine speed, fan speed, engine thrust and turbine inlet temperature signals respectively with signals representative of the actual core engine speed, fan speed, engine thrust and turbine inlet temperature and for generating difference signals;
   feedback generator means for receiving said difference signals and for generating fuel flow, fan pitch and fan exhaust nozzle area feedback signals, each of said feedback signals being a function of all of said difference signals; and
   means for receiving said feedback signals and for modifying said control signals in response thereto.

5. The control system of claim 4 and further comprising
   means interposed between said comparison means and said feedback generator means for integrating said engine thrust, said fan speed and said turbine inlet temperature difference signals prior to their being received by said feedback generator means.

6. A method of controlling a gas turbine engine comprising the steps of:

(a) generating engine control signals for providing a desired level of engine performance;
(b) transmitting said control signals to means for varying engine control variables;
(c) generating signals representative of rated values of engine output variables for the desired level of engine performance;
(d) generating signals representative of the actual values of engine output variables;
(e) comparing said rated engine output variable signals with said actual engine output variable signals to produce difference signals;
(f) weighing said difference signals relative to each other in response to ambient engine operating conditions;
(g) generating feedback signals for each of said control variable as a function of a plurality of said difference signals; and
(h) modifying said engine control signals in accordance with said feedback signals.

7. The method of claim 6 including interposing between steps (e) and (f) the step of
integrating one or more of said difference signals.

8. The method of claim 6 including interposing between steps (e) and (g) the step of
weighing said difference signals relative to each other in response to the selected mode of engine operation.

9. An improved gas turbine engine control system including:
means for generating engine control signals for maintaining a desired level of engine performance;
means for receiving said engine control signals and for varying engine control variables in response thereto;
means for generating signals representative of the actual values of engine output variables;
means for generating signals representative of rated values of engine output variables for the desired level of engine performance; and
comparison means for comparing the rated engine output variable signals with the corresponding actual engine output variable signals and for generating difference signals
wherein the improvement comprises:
feedback generator means for receiving said difference signals and for generating a feedback signal for each of said control variables, each feedback signal being a function of a plurality of said difference signals;
means responsive to a selected mode of engine operation for tailoring said feedback signals to maintain control of the engine about a particular operating point with said tailoring being accomplished by weighing said difference signals relative to each other; and
means for receiving said feedback signals and for modifying said engine control signals in response thereto.

10. The control system of claim 9 and further comprising:
means interposed between said comparison means and said feedback generator means for integrating one or more of said difference signals prior to said difference signals being received by said feedback generator means.

11. A method of controlling a gas turbine engine comprising the steps of:
(a) generating engine control signals for providing a desired level of engine performance;
(b) transmitting said control signals to means for varying engine control variables;
(c) generating signals representative of rated values of engine output variables for the desired level of engine performance;
(d) generating signals representative of the actual values of engine output variables;
(e) comparing said rated engine output variable signals with said actual engine output variable signals to produce difference signals;
(f) weighing said difference signals relative to each other in response to the selected mode of engine operation;
(g) generating feedback signals for each of said control variables as a function of a plurality of said difference signals; and
(h) modifying said engine control signals in accordance with said feedback signals.

12. The method of claim 11 including interposing between steps (e) and (g) the step of
integrating one or more of said difference signals.

* * * * *